United States Patent
Kopec et al.

(10) Patent No.: US 7,004,986 B2
(45) Date of Patent: Feb. 28, 2006

(54) FILTER IN A FILTER HOUSING

(75) Inventors: Edvard Kopec, Speyer (DE); Manfred Winter, Oedheim (DE); Volker Greif, Harthausen (DE); Klemens Dworatzek, Edingen (DE); Marion Hartmann, Neulussheim (DE); Karlheinz Muenkel, Oberderdingen-Flehingen (DE); Jens Haehn, Heidelberg (DE); Joachim Stinzendoerfer, Speyer (DE)

(73) Assignee: Mann & Hummel GmbH, Ludwigsburg (DE)

( * ) Notice: Subject to any disclaimer, the term of this patent is extended or adjusted under 35 U.S.C. 154(b) by 0 days.

(21) Appl. No.: 10/444,098

(22) Filed: May 23, 2003

(65) Prior Publication Data
US 2004/0040271 A1   Mar. 4, 2004

(30) Foreign Application Priority Data
May 23, 2002   (DE) ............................... 102 22 800

(51) Int. Cl.
*B01D 46/00*   (2006.01)
(52) U.S. Cl. .......................... 55/337; 55/357; 55/480; 55/481; 55/502
(58) Field of Classification Search ................ 55/337, 55/357, 385.3, 447, 490, 480, 481, 498, 502, 55/504, 509, 486, 487, 493; 210/232, 470
See application file for complete search history.

(56) References Cited

U.S. PATENT DOCUMENTS

| 991,572 | A | * | 5/1911 | Weisenstein ................. 55/480 |
|---|---|---|---|---|
| 4,159,899 | A | * | 7/1979 | Deschenes ................... 55/454 |
| 4,704,143 | A | * | 11/1987 | Percy .......................... 96/421 |
| 5,125,941 | A | * | 6/1992 | Ernst et al. ................... 55/480 |
| 5,213,596 | A | * | 5/1993 | Kume et al. .................. 55/481 |
| 5,494,497 | A | * | 2/1996 | Lee ............................. 55/480 |
| 6,231,630 | B1 | * | 5/2001 | Ernst et al. ............... 55/385.3 |
| 6,299,661 | B1 | * | 10/2001 | Bloomer .................... 55/385.3 |
| 6,322,602 | B1 | | 11/2001 | Engel et al. ................. 55/428 |
| 6,572,667 | B1 | * | 6/2003 | Greif et al. .................. 55/323 |
| 6,598,580 | B1 | * | 7/2003 | Baumann et al. ....... 123/198 E |

* cited by examiner

Primary Examiner—Frank M. Lawrence
(74) Attorney, Agent, or Firm—Crowell & Moring LLP

(57) ABSTRACT

A filter has a filter housing and a receptacle chamber in the filter housing into which a filter element is insertable. The filter housing has a housing cover for opening and closing an opening of the receptacle chamber. The housing cover is situated in an area of the filter housing between the oncoming flow side and the outgoing flow side of the filter element.

20 Claims, 4 Drawing Sheets

FILTER IN A FILTER HOUSING

BACKGROUND OF THE INVENTION

This invention relates to a filter comprising a filter housing defining a filter receptacle chamber and a housing cover for opening and/or closing the receptacle chamber, and a filter element which is insertable into and removable from the receptacle chamber in the filter housing.

U.S. Pat. No. 6,322,602 B2 describes an air filter having a filter element, which is to have axial flow through it, in a cylindrical filter housing. The receptacle chamber for accommodating the filter in the filter housing is to be sealed on an axial end face in the area of the oncoming flow side of the filter by a housing cover which is loosened to replace the filter element, whereupon the filter element can be removed from the receptacle chamber and replaced by a new filter element.

This embodiment has the disadvantage that the housing cover in the oncoming flow area must be removed to replace the filter element, which initially requires dismantling of the entire filter housing from its installed position, because the housing cover is connected to the lines for supplying the air to be purified. Therefore, the filter element can be replaced only with considerable effort, which increases the maintenance time and incurs a considerable maintenance expense.

SUMMARY OF THE INVENTION

It is an object of the invention to provide an improved filter comprising a housing defining a filter receptacle chamber and having a filter element insertable into and removable from the filter receptacle chamber.

Another object of the invention is to provide a filter which has a simple design.

It is also an object of the invention to provide a filter which can be serviced with minimal effort.

A further object of the invention is to provide a filter with improved utilization of space within the filter housing.

These and other objects are achieved in accordance with the present invention by providing a filter comprising a filter housing defining a filter receptacle chamber and a filter element which is insertable into and removable from the receptacle chamber in the filter housing, wherein the filter housing has a housing cover for opening and closing the receptacle chamber, said housing cover being arranged in an area of the filter housing between the oncoming flow side and the outgoing flow side of the filter element spaced a distance from the flow path of the fluid to be purified.

In the filter according to this invention, the housing cover sits in an area of the filter housing between the oncoming flow side and the outgoing flow side of the filter element and is situated outside the flow path of the liquid or gaseous fluid to be purified. Thus the housing cover does not constitute an obstacle for the fluid to be purified, so the filter can be integrated into the line system in such a way that the connections between the line segments for supplying and/or carrying away of fluid in the area of the oncoming flow side and the outgoing flow side together with the filter element form a continuous flow path that is free of obstacles. Unwanted fluid stagnation spaces can be avoided. In addition, the filter can be installed axially in the flow path in a simple design.

For maintenance purposes, it is sufficient to open the housing cover so that the receptacle chamber in the filter housing is made accessible and the soiled filter element can be replaced with an unused filter element without requiring dismantling of the filter from its installed position in the line system. The unfiltered air lines and clean air lines need not be removed to replace the filter element. This greatly simplifies maintenance work.

Another advantage is that in particular the connections in the oncoming flow area and in the outgoing flow area of the filter are arranged coaxially with the direction of flow through the filter element, thus eliminating the need for making connections which have complex constructions and take up a great deal of space and thus yielding a smaller and more compact design on the whole. In a preferred embodiment, the medium to be purified flows axially through the receptacle chamber, including the filter element arranged therein. The housing cover borders the receptacle chamber radially on the outside and thus is not situated directly in the flow path, and the cover can be attached to and detached from the filter without any assembly work. After opening the housing cover, the filter element can be removed radially and/or inserted into the receptacle chamber.

The dimensions of the receptacle chamber in the filter housing can be adapted exactly to the size of the filter element without having any negative effect on the insertion and/or removal of the filter element. Optionally, however, it may be advantageous to provide installation tolerances for facilitated insertion and/or removal of the filter element. It may also be advantageous to design the receptacle chamber so that it is longer than the filter element in the direction of flow of the fluid to be purified, and the resulting axial tolerance may also be utilized for fixation and/or locking of the filter element.

In the case of an approximately cylindrical receptacle chamber, an especially compact embodiment can be achieved with a suitably shaped filter element through which the fluid flows in the direction of the axis of its cylinder. As an alternative to this, the filter element may also have an oval cross section with axial flow through it. In addition, other cross-sectional shapes may also be considered.

The filter element is advantageously to be locked in a form-fitting manner in the receptacle chamber, whereby the form fit can be accomplished in the direction of the flow through the filter element and/or orthogonally to the direction of flow. In a preferred embodiment, a lock, in particular a form fit, is to be established by locking elements which are situated on the inside of the housing cover and cooperate with respective locking elements on the filter element. In this embodiment, the filter element is automatically locked when the housing cover is closed.

The filter element is advantageously accommodated in a separate carrier housing which constitutes a separate component that is independent of the filter housing and is to be inserted into the receptacle chamber. This embodiment has the advantage that in addition to supporting and holding the filter element, guidance and locking in the receptacle chamber can also be accomplished with simple means by arranging guide elements and/or locking elements, for example, on the carrier housing of the filter element. The carrier housing is capable of absorbing additional forces in the direction of flow as well as orthogonally thereto without any influence on the filter element accommodated in the carrier housing.

In particular, a guide part may be arranged on the carrier housing of the filter element to engage in a guide path which is formed on one wall of the receptacle chamber. On insertion of the filter element into the receptacle chamber, the guide part on the carrier housing is moved along the guide path, an adjusting movement being advantageously executed in the peripheral direction as well as in the axial direction to insert the filter element into its position in the receptacle chamber and/or remove it from the receptacle chamber. Through this forced movement, a sealing element in particular may be adjusted for separating the oncoming flow side and the outgoing flow side of the filter element in its sealing seat and/or removing it from the sealing seat without having to overcome high frictional forces to do so, which would counteract an adjusting movement. The combination of rotational and displacement movement of the carrier housing corresponds to a bayonet closure.

The filter element may be detachably inserted into the carrier housing, in particular inserted axially, so that in the case when a filter element is replaced, the carrier housing may be reused. However, it may also be advantageous to permanently attach the filter element to the carrier housing, e.g., by gluing.

A prefilter, which is designed in particular as a cyclone preseparator, is advantageously connected upstream from the filter element. The dirt particles to be separated in the cyclone preseparator are carried to the outside in a rotating air current due to the centrifugal force and thereby separated. The separated dust can be removed from the filter through a discharge opening.

BRIEF DESCRIPTION OF THE DRAWINGS

The invention will be described in further detail hereinafter with reference to illustrative preferred embodiments shown in the accompanying drawings, in which.

In the figures, like components are identified by the same reference numerals.

DETAILED DESCRIPTION OF PREFERRED EMBODIMENTS

Figure 1:
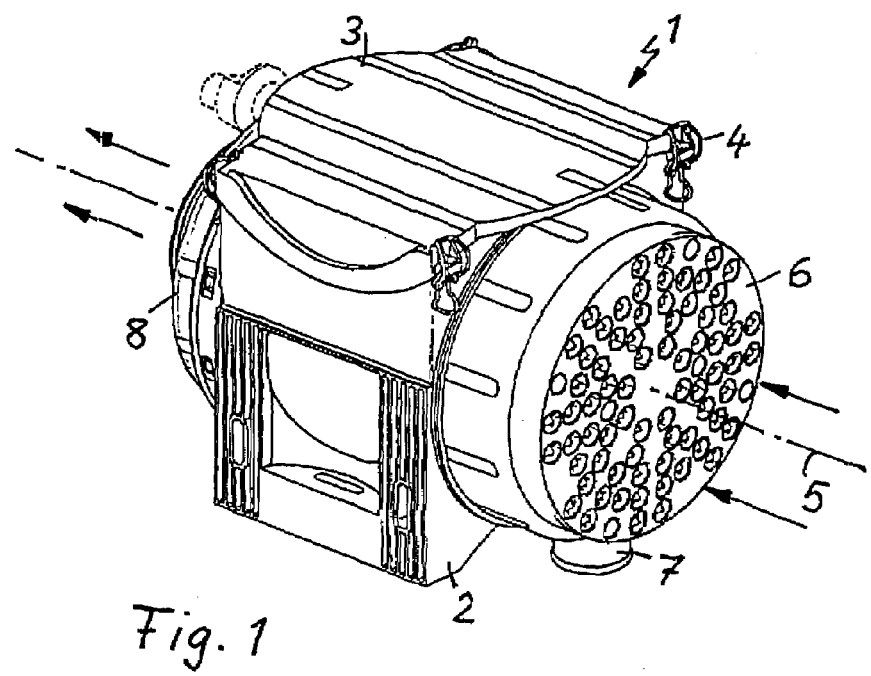
FIG. 1 is a perspective diagram of a filter, where the fluid to be purified flows through it axially, having a sealable housing cover arranged radially on a filter housing.

Filter 1, shown in FIG. 1, comprises in particular an air filter, which is situated in the intake tract of an internal combustion engine and is connected upstream from the air intakes of the engine for purification of the combustion air. Filter 1 has a filter housing 2 in which the filter element is accommodated and a housing cover 3 with which a receptacle chamber for accommodating the filter element is to be sealed. Housing cover 3 is to be fixedly locked to filter housing 2 by locking elements 4. The filter element is designed to be approximately cylindrical with the flow passing through it axially in the direction of longitudinal axis 5 according to the arrows shown. The unfiltered air to be purified is sent to filter 1 axially on its oncoming flow side while the purified clean air also leaves the filter axially through its outgoing flow side.

A prefilter designed as a cyclone pre-separator 6 is connected upstream from the central filter element accommodated in the filter housing. The unfiltered air is advantageously supplied to cyclone preseparator 6 in a rotating air current, whereupon the particles of dirt contained in the unfiltered air are carried to the outside due to the centrifugal force in the cyclone pre-separator and can be removed from the pre-separator housing through a discharge opening 7 which extends radially downward. In addition, a fine filter 8 is connected downstream from the central filter element and is situated adjacent to the outgoing flow side of the filter.

Figure 2:
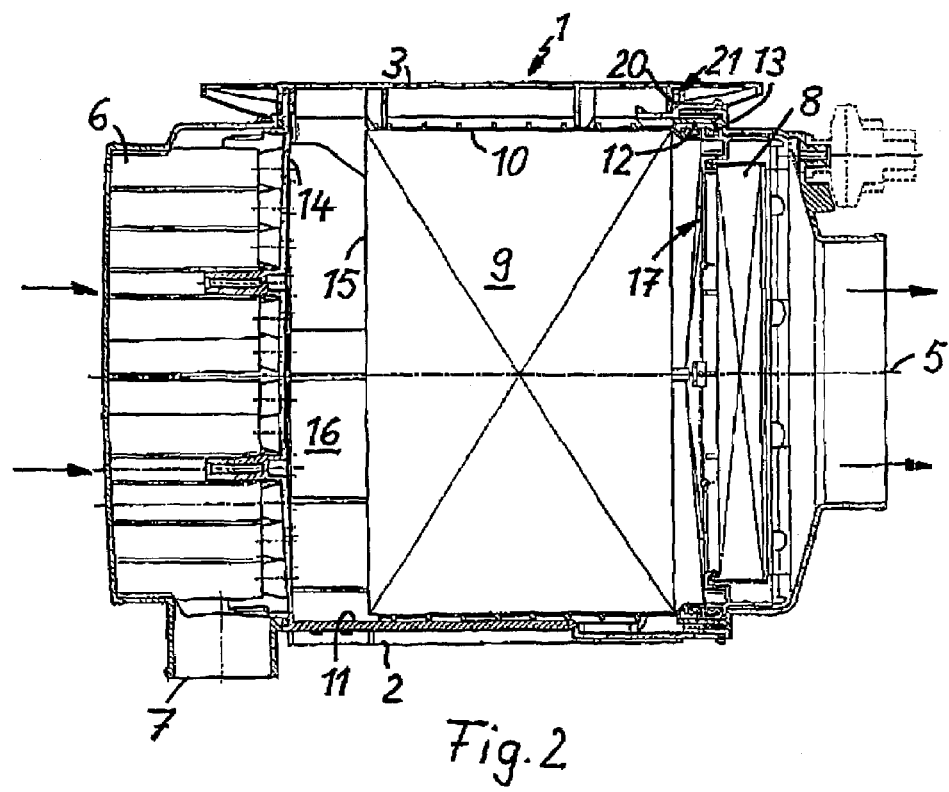
FIG. 2 is a longitudinal section through the filter according to FIG. 1.

As shown in FIG. 2, the central filter element 9, which is arranged axially between cyclone separator 6 and fine filter 8, is accommodated in a receptacle chamber 11 in filter housing 2. Filter element 9 sits in a carrier housing 10, which is cylindrical in shape and is designed as a separate component. Carrier housing 10 forms a hollow cylinder in which filter element 9 is accommodated. Filter element 9 may be glued to the carrier housing 10.

To separate the oncoming flow side, i.e., the unfiltered air side, from the outgoing flow side or clean air side, a sealing ring 12 is provided on the outside of carrier housing 10 adjacent to the downstream fine filter 8; in the installed position of filter element 9, this sealing ring seals the outside of carrier housing 10 to the wall of the receptacle chamber so that the unfiltered air side and the clean air side of the filter are separated in a flow-tight manner in the axial direction. To support the sealing effect, a second sealing ring 13 may be provided on the housing of the fine filter 8 adjacent and parallel to the first sealing ring 12.

Advantageously the prefilter, which is designed as a cyclone preseparator 6, and the downstream fine filter 8 each have their own housing designed to be separate from filter housing 2 and fixedly connected to filter 1 in the assembled position.

Between the air outlet side 14 of cyclone separator 6 and air inlet side 15 of the central filter element 9, there is an intermediate space 16 in receptacle chamber 11 which can be utilized for an axial displacement of filter element 9 including carrier housing 10 on insertion into receptacle chamber 11 and removal from receptacle chamber 11. This axial displacement is associated in particular with a rotational movement of carrier housing 10 and filter element 9, which can thus implement a bayonet closure, which includes both a translational motion and a rotational motion of filter element 9. The rotational and translational motion is advantageously implemented as a forced motion by the fact that guidance means on the filter housing cooperate with respective guidance means on the carrier housing. These guidance means may be in particular a guide path 17 (shown in FIGS. 2 and 4) which is fixedly connected to filter housing 2 and is gripped by a hook-shaped guidance part 18 (shown in FIGS. 3 and 4) on the carrier housing 10.

In addition to sealing receptacle chamber 11, housing cover 3 also has a locking function for form-fitting locking of the carrier housing 10, which is accommodated in receptacle chamber 11, to filter element 9. The locking is implemented by locking elements 20 and 21 on the circumference of carrier housing 10 and/or on the inside of housing cover 3, the first locking element 20 on carrier housing 10 being designed as a radially projecting flange which in the locked position engages in the second locking element 21 that is designed like a groove on the lower side of housing cover 3. A form-fitting connection is to be established in both axial and peripheral directions by this locking.

Figure 3:
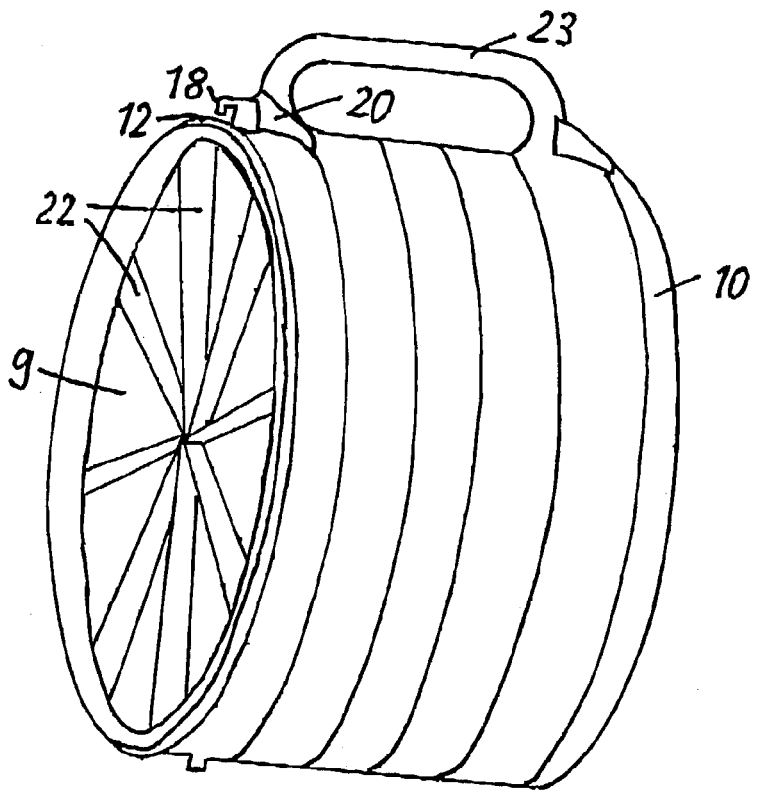
FIG. 3 is a perspective diagram of a filter element which is to be inserted into a filter housing and is accommodated in a separate carrier housing.
Figure 4:
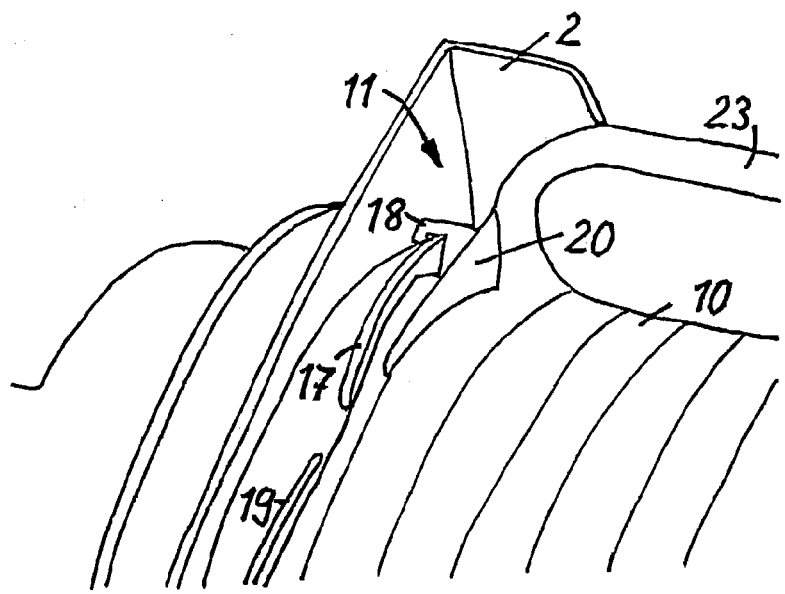
FIG. 4 is a detail in a perspective diagram of the filter element with the carrier housing, which is inserted into a receptacle chamber in the filter housing.

FIG. 3 shows an isolated diagram of the hollow cylindrical carrier housing 10 with filter element 9 accommodated therein. Carrier housing 10 is advantageously made of plastic and has struts 22 running radially in the interior space, imparting additional stability to filter element 9. In addition, a handle 23 running parallel to the axial direction is arranged on the lateral surface of carrier housing 10 for facilitated handling in insertion and removal of the filter element and/or the carrier housing. FIGS. 3 and 4 show the radially projecting flange-like locking element 20 running in the peripheral direction in the lateral area of handle 23.

Guide part 18 extends in the axial direction on the lateral surface of carrier housing 10. As shown in FIG. 4, in the installed position the hook-shaped guide part 18 engages around guide path 17, which is connected to filter housing 2 and extends approximately in a spiral pattern in the peripheral direction with an axial component. In a rotational movement of carrier housing 10, the carrier housing including filter element 9 also simultaneously executes a translational movement in the axial direction.

A total of two guide paths 17 and 19 are provided, arranged with mirror symmetry to one another, forming a gap between them through which the complementary-shaped guide part 18 on the carrier housing 10 can be pushed onto one of the two guide paths 17 or 19 and can be removed from the guide paths.

With the filter described here, the housing cover, which seals the opening of the receptacle chamber, is to be connected to the filter housing by means of the sealing elements which secure it. A sealing element may also be a sword-like locking part, which is arranged on the cover and, when the housing cover is closed, is braced against the gasket on the filter element with the help of a support on the carrier housing. In addition, an eccentric lever may also be used as the sealing and/or locking element; it is arranged on the carrier housing and is braced between the gasket and the filter housing by rotation of the carrier housing.

When the sealing elements are released, the housing cover may either be swung open by a hinge or removed completely. According to an alternative embodiment, it may also be advantageous to arrange the cover so it slides on the wall of the recess, so that to open and close the housing cover, it may glide along the inside or outside of the wall in the peripheral direction or in the radial direction.

Figure 5:
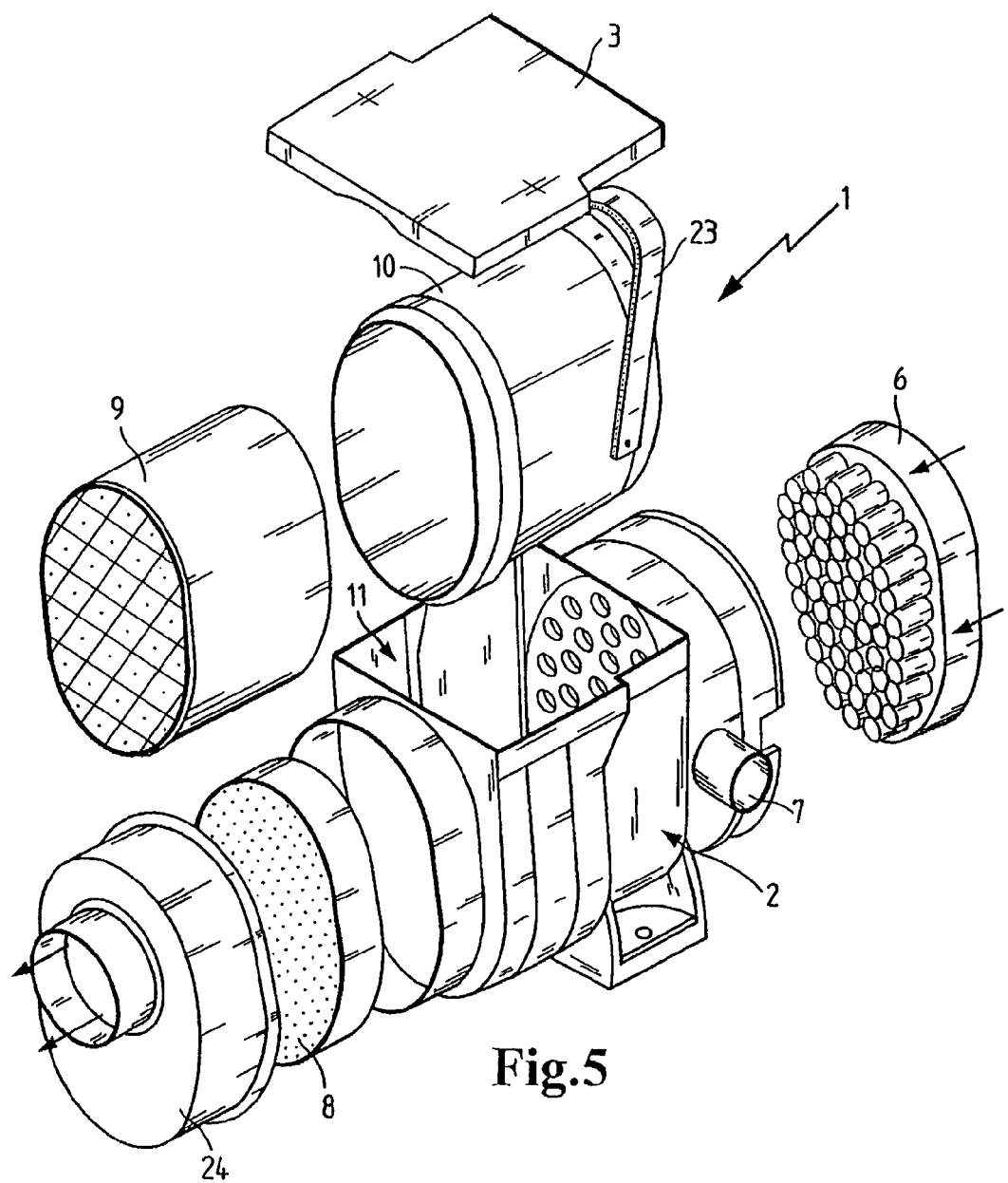
FIG. 5 is an exploded diagram of a filter having an oval filter element and a carrier housing.

Filter 1 shown in FIG. 5 has the same basic design as that in FIG. 1 and/or 2 but with the difference that the filter element 9 and the carrier housing 10, which accommodates the filter element, each have an oval cross section. Receptacle chamber 11 in filter housing 2 also has a corresponding inside cross section to accommodate the cartridge comprising the carrier housing and filter element. The cartridge is inserted radially into receptacle chamber 11, and the medium to be purified flows though it axially. The upper opening in the receptacle chamber 11 through which the cartridge is inserted is to be sealed by the housing cover 3.

As in the illustrative embodiment described above, a cyclone separator 6 is connected upstream from the filter housing 2, and a fine filter 8 is connected downstream, whereby the fine filter 8 is to be sealed axially by an exterior cover part 24.

Figure 6:
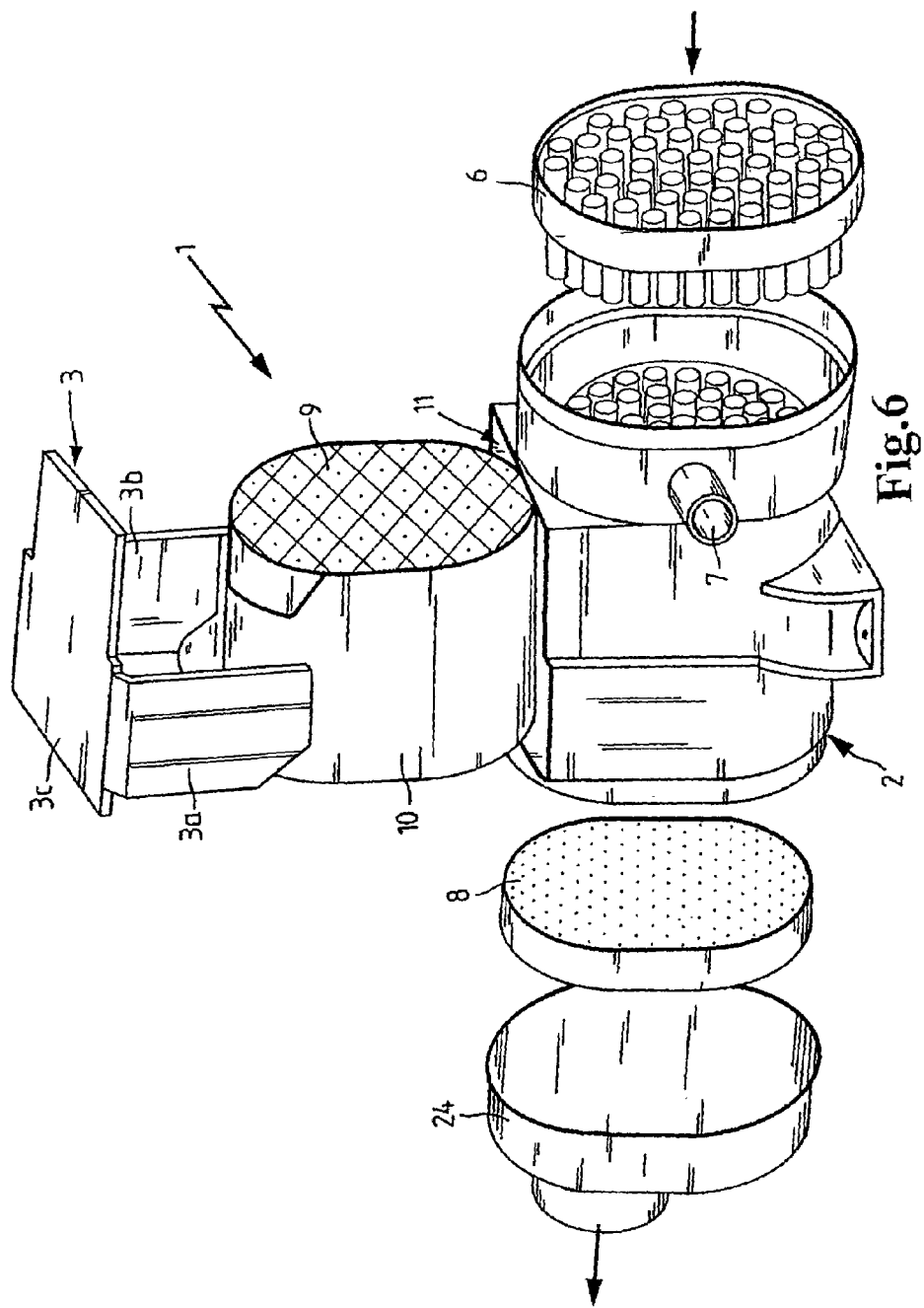
FIG. 6 is a diagram corresponding to FIG. 5, but with a housing cover, which locks the filter element and the carrier housing on the filter housing in an interlocked manner.

In the illustrative embodiment shown in FIG. 6, filter 1 again has an oval cross section. However, the housing cover 3 has a shape suitable for form-fitting fixation of filter element 9 and carrier housing 10 inside receptacle chamber 11 in filter housing 2. Therefore, housing cover 3 has two lateral cover segments 3a and 3b which together with an upper cover plate 3c form a housing cover with an approximately arc-shaped cross section for extending beyond the carrier housing 10 and filter element 9. In the assembly position, lateral cover segments 3a and 3b are inserted into receptacle chamber 11 in filter housing 2 and are situated between the inside wall of receptacle chamber 11 and the lateral surface of carrier housing 10. In addition, an axial lock is provided for radially securing carrier housing 10 and filter element 9 inside of receptacle chamber 11 by means of cooperating shoulders on the lateral surface of the carrier housing and on housing cover 3.

The foregoing description and examples have been set forth merely to illustrate the invention and are not intended to be limiting. Since modifications of the described embodiments incorporating the spirit and substance of the invention may occur to persons skilled in the art, the invention should be construed broadly to include all variations within the scope of the appended claims and equivalents.

What is claimed is:

1. A filter comprising a filter housing defining a filter receptacle chamber and a filter element which is insertable into and removable from the receptacle chamber in the filter housing, wherein the filter housing has a housing cover for opening and closing the receptacle chamber, said housing cover being arranged in an area of the filter housing between the oncoming flow side and the outgoing flow side of the filter element and spaced a distance from the flow path of the fluid to be purified, and said housing cover comprising an upper cover plate and two lateral cover segments which extend into the receptacle chamber in the filter housing between the inside wall of receptacle chamber and the lateral surface of the filter element when the cover is assembled to the filter housing, said cover segments cooperating with the housing to axially lock the filter element in the filter housing, and wherein the filter element is at least approximately cylindrical.

2. A filter according to claim 1, wherein the fluid which is to be purified flows axially through the receptacle chamber and the filter element, and the housing cover delimits the receptacle chamber radially.

3. A filter comprising a filter housing defining a filter receptacle chamber and a filter element which is insertable into and removable from the receptacle chamber in the filter housing, wherein the filter housing has a housing cover for opening and closing the receptacle chamber, said housing cover being arranged in an area of the filter housing between the oncoming flow side and the outgoing flow side of the filter element and spaced a distance from the flow path of the fluid to be purified, and said housing cover comprising an upper cover plate and two lateral cover segments which extend into the receptacle chamber in the filter housing between the inside wall of receptacle chamber and the lateral surface of the filter element when the cover is assembled to the filter housing, said cover segments cooperating with the housing to axially lock the filter element in the filter housing, and wherein the filter element has an oval cross section.

4. A filter according to claim 1, wherein the filter element is lockable in a form-fitting manner in the receptacle chamber.

5. A filter according to claim 4, wherein the filter element is secured in the receptacle chamber in a form-fitting manner by the housing cover.

6. A filter comprising a filter housing defining a filter receptacle chamber and a filter element which is insertable into and removable from the receptacle chamber in the filter housing, wherein the filter housing has a housing cover for opening and closing the receptacle chamber, said housing cover being arranged in an area of the filter housing between the oncoming flow side and the outgoing flow side of the filter element and spaced a distance from the flow path of the fluid to be purified, and said housing cover comprising an upper cover plate and two lateral cover segments which extend into the receptacle chamber in the filter housing between the inside wall of receptacle chamber and the lateral surface of the filter element when the cover is assembled to the filter housing, said cover segments cooperating with the housing to axially lock the filter element in the filter housing, and wherein the filter element is accommodated in a separate carrier housing which is insertable into the receptacle chamber in the filter housing, and the carrier housing is lockable in the receptacle chamber by means of a combined rotational and displacement motion in the manner of a bayonet closure.

7. A filter according to claim 6, wherein the filter element is detachably insertable into the carrier housing.

8. A filter according to claim 6, wherein a first locking element is situated on the carrier housing so that when the filter element is installed, the filter element cooperates with a second locking element on the housing cover.

9. A filter according to claim 6, wherein a guide path extends peripherally and axially on a wall of the receptacle chamber and cooperates with a guide member on the carrier housing.

10. A filter according to claim 6, further comprising a handle situated on the carrier housing.

11. A filter according to claim 6, wherein the oncoming flow side and the outgoing flow side of the filter element in the receptacle chamber are separated in a fluid-tight manner by at least one sealing element, and the sealing element is mounted on the carrier housing.

12. A filter according to claim 11, wherein said sealing element is a sealing ring.

13. A filter according to claim 1, further comprising a prefilter accommodated in the receptacle chamber upstream of the filter element.

14. A filter according to claim 13, wherein said prefilter comprises a cyclone separator.

15. A filter according to claim 1, further comprising a fine filter accommodated in the receptacle chamber downstream of the filter element.

16. A filter according to claim 3, wherein the fluid which is to be purified flows axially through the receptacle chamber and the filter element, and the housing cover delimits the receptacle chamber radially.

17. A filter according to claim 3, wherein the filter element is lockable in a form-fitting manner in the receptacle chamber.

18. A filter according to claim 17, wherein the filter element is secured in the receptacle chamber in a form-fitting manner by the housing cover.

19. A filter according to claim 3, further comprising a prefilter accommodated in the receptacle chamber upstream of the filter element.

20. A filter according to claim 3, further comprising a fine filter accommodated in the receptacle chamber downstream of the filter element.

* * * * *